(12) United States Patent
Arakawa

(10) Patent No.: US 10,647,223 B2
(45) Date of Patent: May 12, 2020

(54) POWER TRANSMISSION DEVICE FOR POWER SEAT

(71) Applicant: TOYOTA BOSHOKU KABUSHIKI KAISHA, Aichi-ken (JP)

(72) Inventor: Yuji Arakawa, Aichi-ken (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 176 days.

(21) Appl. No.: 15/863,213

(22) Filed: Jan. 5, 2018

(65) Prior Publication Data
US 2018/0194250 A1 Jul. 12, 2018

(30) Foreign Application Priority Data

Jan. 12, 2017 (JP) ................... 2017-003215

(51) Int. Cl.
*B60N 2/16* (2006.01)
*B60N 2/07* (2006.01)
(Continued)

(52) U.S. Cl.
CPC ......... *B60N 2/1635* (2013.01); *B60N 2/0296* (2013.01); *B60N 2/067* (2013.01);
(Continued)

(58) Field of Classification Search
CPC ... F16H 61/36; F16H 1/12; F16H 1/16; B60N 2/1635; B60N 2/0296; B60N 2/067; B60N 2/1615; B60N 2/165; B60N 2/166; B60N 2002/0236; F16C 1/262; F16C 1/02; F16C 1/08; F16C 1/06
(Continued)

(56) References Cited

U.S. PATENT DOCUMENTS 6,905,415 B2 * 6/2005 Decker ................... F16C 1/226
174/74 R
7,104,584 B2 * 9/2006 Moriyama ........... B60N 2/0232
296/65.14
(Continued)

FOREIGN PATENT DOCUMENTS

DE 8706591 6/1987
DE 100 57 476 5/2002
(Continued)

OTHER PUBLICATIONS

Office Action in corresponding German Patent App. No. 10 2018 200 142.1, dated Oct. 8, 2019 (with English translation).

*Primary Examiner* — Randell J Krug
(74) *Attorney, Agent, or Firm* — Greenblum & Bernstein, P.L.C.

(57) ABSTRACT

A power transmission device for a power seat, the power transmission device including: a motor; an adjustment mechanism of the power seat; and a power transmission cable including: an outer cable; and an inner cable, wherein one end of the outer cable is connected to a bearing member for supporting an output shaft of the motor or a bearing member for supporting an input shaft of the adjustment mechanism so as to be movable in an axial direction of the outer cable, and wherein one end of the inner cable is connected to the output shaft of the motor or the input shaft of the adjustment mechanism so as to be movable in an axial direction of the inner cable.

11 Claims, 8 Drawing Sheets

(51) Int. Cl.
*F16H 19/06* (2006.01)
*B60N 2/225* (2006.01)
*B60N 2/02* (2006.01)
*B60N 2/06* (2006.01)

(52) U.S. Cl.
CPC ............... *B60N 2/07* (2013.01); *B60N 2/165* (2013.01); *B60N 2/1615* (2013.01); *B60N 2/2252* (2013.01); *F16H 19/06* (2013.01); *B60N 2002/0236* (2013.01)

(58) Field of Classification Search
USPC .......................................................... 74/89.14
See application file for complete search history.

(56) References Cited

U.S. PATENT DOCUMENTS

2002/0910001     7/2002   Decker et al.
2003/0168566 A1*   9/2003   Ito ........................ B60N 2/0232
                                                                         248/429
2014/0238188 A1*   8/2014   Ito ........................ B60N 2/0228
                                                                           74/664

FOREIGN PATENT DOCUMENTS

DE     10 2009 008 501     8/2010
EP          2 772 385     9/2014
JP          2013-107624     6/2013

* cited by examiner

POWER TRANSMISSION DEVICE FOR POWER SEAT

CROSS-REFERENCE TO RELATED APPLICATIONS

This application claims priority from Japanese Patent Application No. 2017-003215 filed on Jan. 12, 2017, the entire contents of which are incorporated herein by reference.

TECHNICAL FIELD

The disclosure relates to a power transmission device for a power seat used in a vehicle such as an automobile, an airplane, a ship and a train, or used in a movie theater or the like.

BACKGROUND

A power seat in which a lifter adjustment mechanism, a tilt adjustment mechanism, a slide adjustment mechanism and a reclining angle adjustment mechanism are operated by a single motor is disclosed in JP-A-2013-107624. Power of the motor is transmitted to each mechanism via a power transmission cable. The motor, the lifter adjustment mechanism and the tilt adjustment mechanism are fixed to a side frame that is a framework member of the seat. On the other hand, the slide adjustment mechanism is fixed to a slide rail.

When the lifter adjustment mechanism is operated, a height of the side frame with respect to the slide rail is changed. Therefore, a relative distance between the motor fixed to the side frame and the slide adjustment mechanism fixed to the slide rail is changed by the operation of the lifter adjustment mechanism. A change in the relative distance is absorbed by a change in the degree of curvature of the power transmission cable arranged between the motor and the slide adjustment mechanism.

FIG. 8 shows the change in the degree of curvature of the power transmission cable. A height of a cable connector 151 connected to a side frame side is changed in response to a change in height of the side frame due to the lifter adjustment mechanism. On the other hand, a height of a sliding gear box 113 of the slide adjustment mechanism is invariable. As a result, the degree of curvature of a power transmission cable 116 disposed between the cable connector 151 and the sliding gear box 113 is changed. The degree of curvature of the power transmission cable 116 is increased as the height of the side frame is lowered from a state where the side frame is set at the highest position. The reason is that the relative distance between the cable connector 151 and the sliding gear box 113 becomes longest in the state where the side frame is set at the highest position and the relative distance between the cable connector 151 and the sliding gear box 113 becomes shortest in the state where a side frame is set at the lowest position. Compared to a power transmission cable 116 (UM) in the state where the side frame is set at the highest position, the degree of curvature is increased as the height of the side frame is lowered as indicated by a power transmission cable 116 (N) and a power transmission cable 116 (DM).

A change in the degree of curvature of the power transmission cable changes efficiency of the power transmission. Therefore, an operation speed of the slide adjustment mechanism is changed depending on the degree of curvature of the power transmission cable. Further, in a state where the degree of curvature of the power transmission cable is increased, operation noise of the power transmission cable is increased. Therefore, in a state where the relative distance between the motor and the slide adjustment mechanism is reduced and the degree of curvature of the power transmission cable is increased, noise of an operation of the slide adjustment mechanism is increased.

SUMMARY

The disclosure aims to provide a power transmission device for a power seat in which an adjustment mechanism of the power seat is operated by transmitting power of a motor to the adjustment mechanism via a power transmission cable, the motor and the adjustment mechanism are respectively fixed to separate members that move relative to each other, and the motor and the adjustment mechanism can be relatively moved while maintaining a connected stated between the motor or the adjustment mechanism and the power transmission cable. In this way, the disclosure can suppress a change in the degree of curvature of the power transmission cable caused by a relative movement between the motor and the adjustment mechanism.

An aspect of the present disclosure is a power transmission device for a power seat, the power transmission device including: a motor; an adjustment mechanism of the power seat; and a power transmission cable which is configured to transmit power of the motor to the adjustment mechanism of the power seat, the power transmission cable including: an outer cable; and an inner cable which is rotatable in the outer cable, wherein the motor is fixed to a first member and the adjustment mechanism is fixed to a second member, and the first member and the second member are configured to be moved relative to each other, wherein a first end of the inner cable of the power transmission cable is connected to an output shaft of the motor and a second end of the inner cable of the power transmission cable is connected to an input shaft of the adjustment mechanism, wherein a first end of the outer cable of the power transmission cable is connected to a bearing member for supporting the output shaft of the motor and a second end of the outer cable of the power transmission cable is connected to a bearing member for supporting the input shaft of the adjustment mechanism, wherein the first end of the outer cable is connected to the bearing member for supporting the output shaft of the motor so as to be movable in an axial direction of the first end of the outer cable, or the second end of the outer cable is connected to the bearing member for supporting the input shaft of the adjustment mechanism so as to be movable in an axial direction of the second end of the outer cable, and wherein the first end of the inner cable is connected to the output shaft of the motor so as to be movable in an axial direction of the first end of the inner cable, or the second end of the inner cable is connected to the input shaft of the adjustment mechanism so as to be movable in an axial direction of the second end of the inner cable.

DETAILED DESCRIPTION

FIGS. 1 to 7 show an embodiment of the disclosure. This embodiment represents an example in which the power transmission device for the power seat of the disclosure is applied to a vehicle front seat (hereinafter, simply referred to as a "seat") 6. In each drawing, respective directions in a state where the seat 6 is mounted to a vehicle are indicated by arrows. In the following, the descriptions relating to the directions will be made on the basis of these directions.

Figure 1:
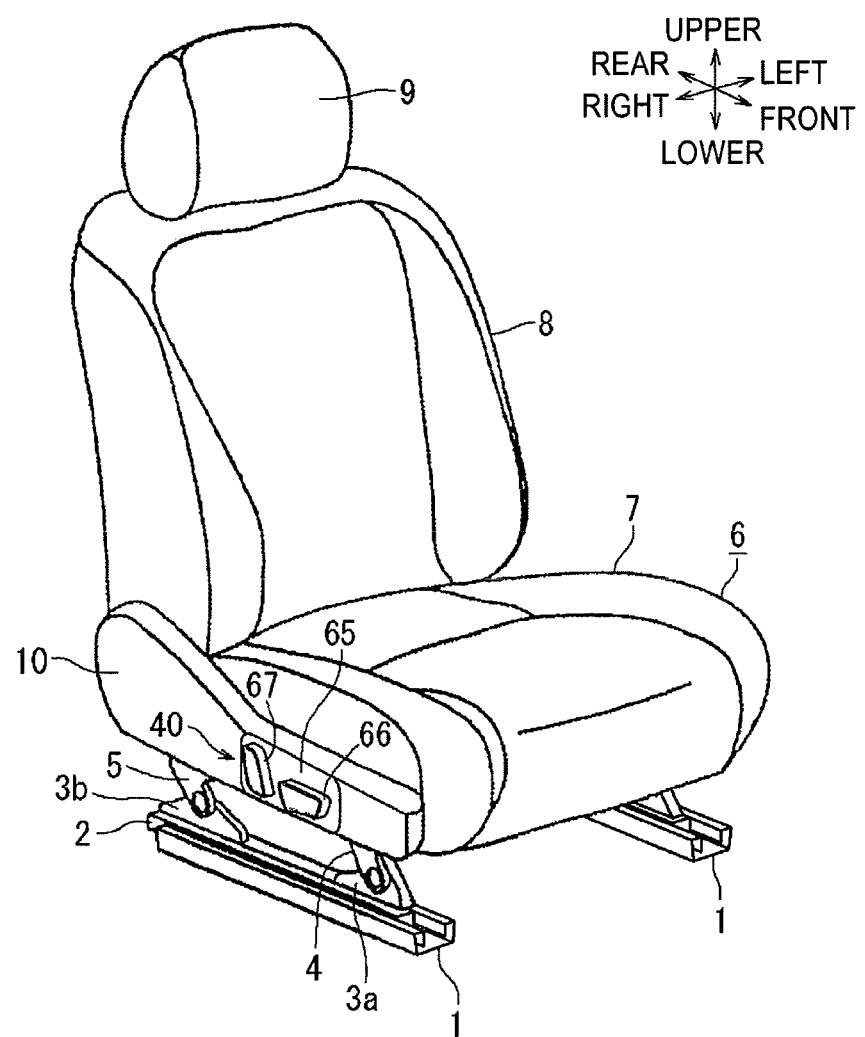
FIG. 1 is a perspective view of a vehicle front seat to which a power transmission device of a power seat according to an embodiment of the disclosure is applied.

FIG. 1 shows an appearance of the seat 6. In the seat 6, a seat back 8 forming a backrest is fixed to a rear side of a seat cushion 7 forming a seating part so as to freely rotate back and forth. Therefore, a recliner (not shown) for adjusting a reclining angle of the seat back 8 is provided at a hinge portion between a rear portion of the seat cushion 7 and a lower portion of the seat back 8.

A headrest 9 for supporting a head of a seated occupant from behind is provided at an upper end portion of the seat back 8. Further, a right portion of the seat cushion 7 and the lower portion of the seat back 8 are covered with a side shield 10. A driving device 40 for a power seat is accommodated in the side shield 10. The driving device 40 can adjust a seating posture of an occupant seated on the seat 6 according to the preference of the occupant. A first operation knob 66 and a second operation knob 67 forming an operation member of the driving device 40 are disposed to be exposed to an outside of the side shield 10 so that they can be operated by the seated occupant.

The seat 6 is fixed to a vehicle floor (corresponding to "support base" in the disclosure) so as to freely move back and forth. Therefore, on the vehicle floor, a pair of lower rails 1 is fixed to the lower sides of both left and right side portions of the seat cushion 7. Then, upper rails 2 are respectively fitted onto the lower rails 1 and are slidable in a front and rear direction with respect to the lower rails 1. The lower rail 1 and the upper rail 2 correspond to "slide member" in the disclosure.

Brackets 3a and 3b are fixed on each of the upper rails 2, respectively. The seat cushion 7 is fixed on the brackets 3a and 3b via a front link 4 and a rear link 5, respectively. The front link 4 and the rear link 5 are tiltable in the front and rear direction with respect to the brackets 3a and 3b. Therefore, as described later, a height of the seat 6 from the vehicle floor can be adjusted by an angle adjustment of the front link 4 and the rear link 5.

Figure 2:
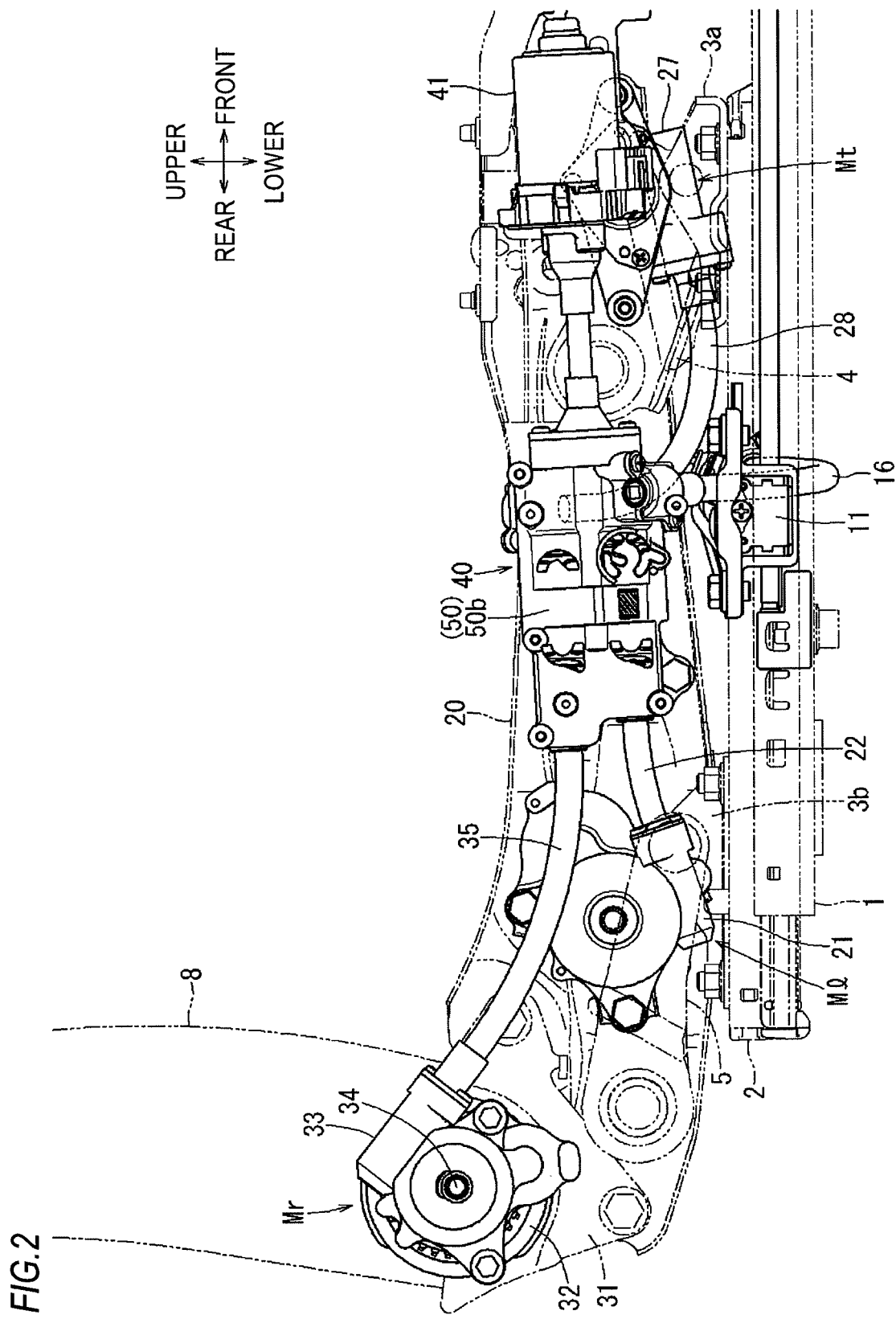
FIG. 2 is an enlarged front view of a main part of the embodiment.
Figure 3:
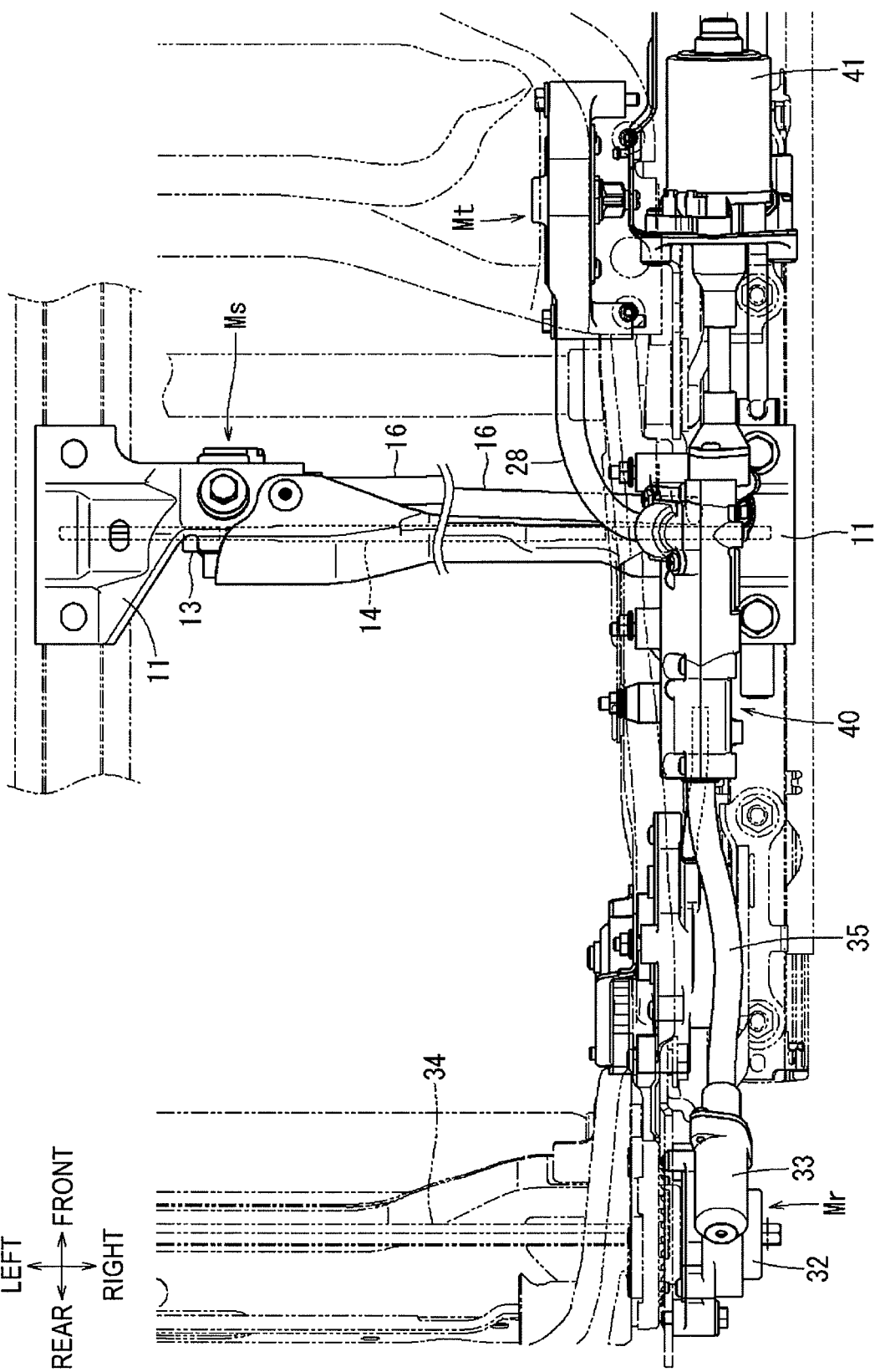
FIG. 3 is an enlarged plan view of a main part of the embodiment.
Figure 4:
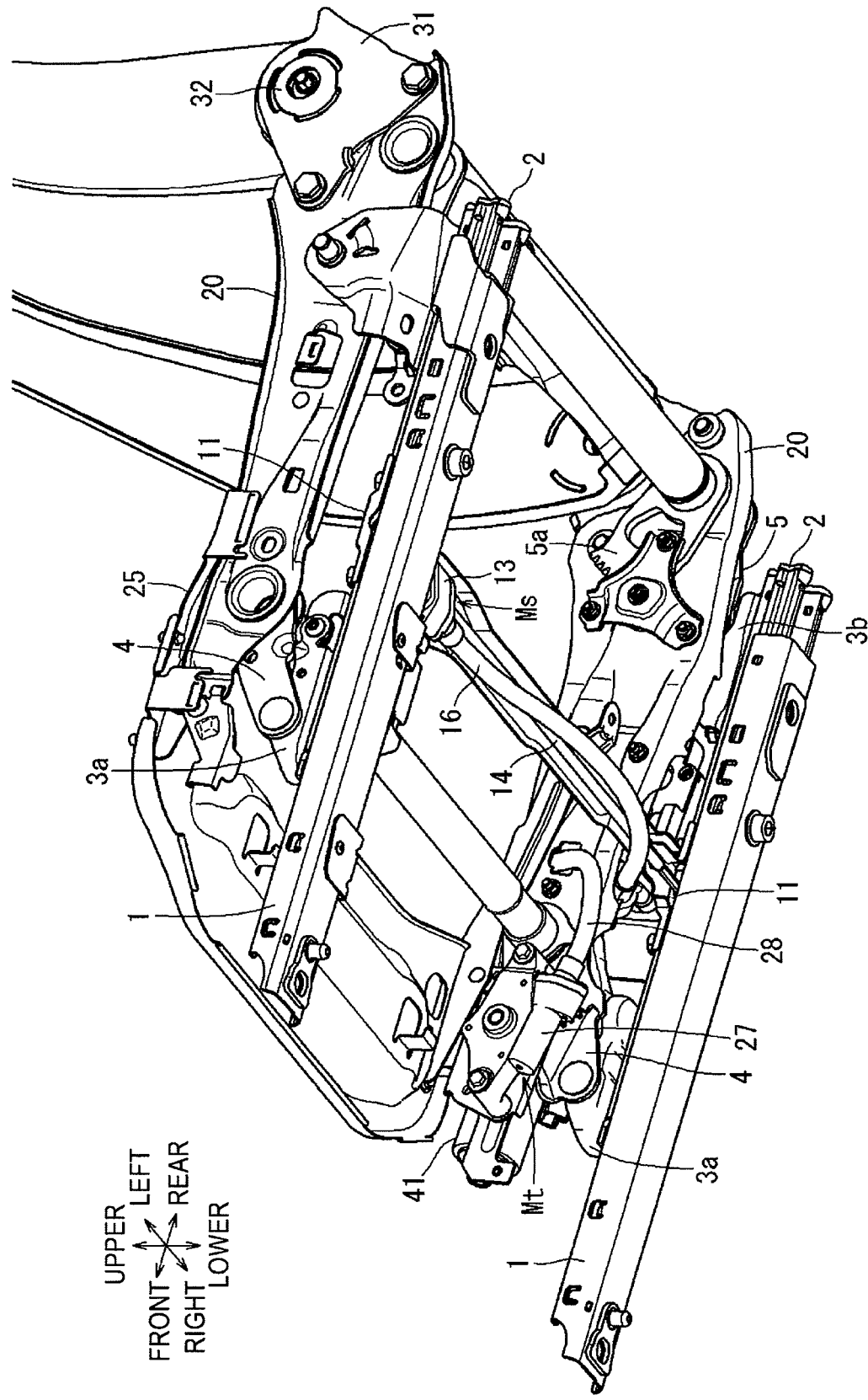
FIG. 4 is an enlarged perspective view of a main part of the embodiment.

FIGS. 2 to 4 show a lower framework structure of the seat 6 together with the driving device 40. A sliding nut member 11 is rotatably fixed in each of the left and right lower rails 1. Each of the sliding nut members 11 is provided with a female screw penetrating in the front and rear direction. On the other hand, a sliding lead screw 12 (see FIG. 6) extending along the front and rear direction of each upper rail 2 is fixed in each of the left and right upper rails 2. A male screw is formed on an outer periphery of the sliding lead screw 12 and is screwed with the female screw of the sliding nut member 11. Although not shown, a bevel gear is formed on an outer peripheral side of each sliding nut member 11, and a bevel gear for direction change meshing with each bevel gear is provided. Each bevel gear for direction change is fixed to each end portion of a sliding connection rod 14 and is connected to each other. At least the end portions of the sliding connection rod 14 have a polygonal column shape.

A sliding gear box 13 is coupled to a portion between both ends of the sliding connection rod 14. Bevel gears (not shown) meshing with each other are incorporated in the sliding gear box 13. One of the bevel gears is fixed so as to rotate synchronously with the sliding connection rod 14, and the other of the bevel gears is fixed so as to be rotated by a sliding torque cable 16 (corresponding to "power transmission cable" in the disclosure) to be described later.

Therefore, when the sliding torque cable 16 is rotated by receiving power of a motor 41, the rotation of the sliding torque cable 16 is transmitted to the sliding connection rod 14 via the sliding gear box 13. Then, the rotation of the sliding connection rod 14 is transmitted to the sliding nut member 11. When the sliding nut member 11 is rotated, the rotation of the sliding nut member is converted into a forward and rearward movement by the sliding lead screw 12 screwed with the sliding nut member 11, so that the sliding nut member 11 and the sliding connection rod 14 move in the front and rear direction. Here, the sliding nut member 11, the sliding lead screw 12, the sliding gear box 13, and the sliding connection rod 14 constitute a slide adjustment mechanism Ms as a sliding position adjustment mechanism, together with the lower rail 1 and the upper rail 2.

Lower ends of the front link 4 on each side are pivotably fixed to the bracket 3a and upper ends thereof are pivotably fixed to a front end portion of a side frame 20 constituting a framework member of the seat cushion 7. Further, lower ends of the rear link 5 on each side are pivotably fixed to the bracket 3b and upper ends thereof are pivotably fixed to a rear end portion of the side frame 20. Therefore, the upper rail 2, the brackets 3a and 3b, the front link 4, the rear link 5, and the side frame 20 constitute a four-bar linkage.

At the right rear link 5, a sector gear portion 5a widening forward in a substantially fan shape is formed about a rotating shaft on the side of the side frame 20. Specifically, the sector gear portion 5a is separated in a right and left direction with respect to the rear link 5 and is integrated with the rotating shaft. Further, a lifter gear box 21 is provided on the side surface of the side frame 20 and located adjacent to the right rear link 5. The lifter gear box 21 incorporates a speed reduction mechanism including a worm (not shown) and a worm wheel (not shown). A lifter pinion (not shown) is coaxially fixed to the worm wheel. The lifter pinion is meshed with the sector gear portion 5a. Then, the worm is fixed to an end portion of a lifter torque cable (corresponding to "power transmission cable" in the disclosure) 22 extending forward from the lifter gear box 21.

When the lifter torque cable 22 is rotated, the rotation of the lifter torque cable 22 is transmitted to the worm, decelerated by the worm wheel, and transmitted to the lifter pinion. The rotation of the lifter pinion is transmitted to the rear link 5 via the sector gear portion 5a, so that the rear link 5 rotates around its upper end. Thereby, the front link 4 and the rear link 5 constituting the four-bar linkage rotate about fixed points on the side of the brackets 3a and 3b, so that the side frame 20 moves up and down with respect to the brackets 3a and 3b. Here, the front link 4, the rear link 5, and the lifter gear box 21 constitute a lifter adjustment mechanism Ml as a lifter position adjustment mechanism, together with the brackets 3a and 3b and the side frame 20.

On the front side of the right and left side frames 20 from center portions in the front and rear direction, a tilt arm 25 made of a plate material is respectively fixed so as to freely rotate around a rear end portion of tilt arm 25. An upper end of a tilt link (not shown) is rotatably fixed to a front end portion of each tilt arm 25, and a lower end of the tilt link is rotatably fixed coaxially to the upper end of the front link 4.

At the right tilt link, a sector gear portion (not shown) widening forward in a substantially fan shape is formed about a rotating shaft at its lower end. Further, a tilting gear box 27 is provided on the side surface of the side frame 20 and is located adjacent to the right tilt link. The tilting gear box 27 incorporates a speed reduction mechanism including a worm (not shown) and a worm wheel (not shown). A tilting pinion (not shown) is coaxially fixed to the worm wheel. The tilting pinion is meshed with the sector gear portion. Then, the worm is fixed to an end portion of a tilting torque cable (corresponding to the power transmission cable in the disclosure) 28 extending rearward from the tilting gear box 27.

When the tilting torque cable 28 is rotated, the rotation of the tilting torque cable 28 is transmitted to the worm, decelerated by the worm wheel, and transmitted to the tilting pinion. The rotation of the tilting pinion is transmitted to the tilt link via the sector gear portion, so that the tilt link rotates around its lower end. Thereby, the tilt arm 25 rotates around its rear end portion, so that the front end portion thereof moves up and down. Therefore, an inclination angle of the tilt arm 25 with respect to the side frame 20 increases or decreases. Here, the tilt link and the tilting gear box 27 constitute a tilt adjustment mechanism Mt as a tilting position adjustment mechanism, together with the tilt arm 25 and the side frame 20.

A recliner plate 31 made of a plate material is fixed to a rear end portion of the side frame 20 on each side. A lower end portion of the seat back 8 is coupled to the recliner plate 31 via a substantially disc-shaped recliner 32. The recliner 32 constitutes a well-known hypocycloid reducer. That is, although not shown, the recliner 32 includes a first disc, a second disc, a wedge member, and a cam shaft and the like. The first disc has an internal gear and is fixed to the recliner plate 31. The second disc has an external gear which has a smaller number of teeth than that of the internal gear and is meshed with the internal gear. The wedge member maintains an eccentric state of the internal gear and the external gear so as to engage the internal gear and the external gear. The cam shaft is disposed coaxially with the first disc (internal gear), pivotally supports the second disc and moves the wedge member. Then, the recliner 32 is fixed to the seat back 8 at the second disc. In the recliner 32, the movement of the wedge member according to the rotation of the cam shaft causes the second disc to revolve while maintaining the meshed state of the internal gear and the external gear. In this way, the rotation of the cam shaft is decelerated as the number of rotation of the second disc at the time of this revolution. Then, the rotation of the second disc with respect to the first disc causes the seat back 8 to be pivoted (tilted) with respect to the seat cushion 7.

A recliner gear box 33 is fixed to an outer side of the recliner plate 31 on the right side. This recliner gear box 33 incorporates a speed reduction mechanism including a worm (not shown) and a worm wheel (not shown). The worm wheel is connected to a polygonal columnar recliner connecting rod 34 which has an axis extending in a seat width direction and is bridged between the recliners 32 on both sides so as to rotate integrally with the polygonal columnar recliner connecting rod 34. This recliner connecting rod 34 penetrates the recliners 32 on both sides and is connected to the cam shafts so as to rotate integrally with the cam shafts. On the other hand, the worm is fixed to an end portion of a recliner torque cable (corresponding to "power transmission cable" in the disclosure) 35 extending forward from the recliner gear box 33.

Therefore, when the recliner torque cable 35 is rotated, the rotation of the recliner torque cable 35 is decelerated between the worm that is an input side of the recliner gear box 33 and the worm wheel that is an output side thereof, and is transmitted to the recliner connecting rod 34. Then, the rotation of the recliner connecting rod 34 is transmitted to the cam shafts of the recliners 32. In this way, in the manner described above, the second disc of the recliner 32 is rotated with respect to the first disc of the recliner 32, and the seat back 8 is rotated (tilted) with respect to the seat cushion 7. Here, the recliner 32, the recliner gear box 33 and the recliner connecting rod 34 constitute a reclining angle adjustment mechanism Mr as a recliner position adjustment mechanism, together with the recliner plate 31 and the seat back 8.

As described above, the present embodiment is applied to a so-called 8-way power seat in which the position of the seat can be adjusted in one direction and a reversed direction in each of the slide adjustment mechanism Ms, the lifter adjustment mechanism Ml, the tilt adjustment mechanism Mt and the reclining angle adjustment mechanism Mr. Each of these adjustment mechanisms Ms, Ml, Mt and Mr, corresponds to the adjustment mechanism in the disclosure.

The driving device 40 is fixed to an intermediate portion in the front and rear direction of the right side frame 20 located between the lifter gear box 21 and the tilting gear box 27. The driving device 40 includes the motor 41 having a single output shaft. The output shaft of the motor 41 is connected to the sliding torque cable 16, the lifter torque cable 22, the tilting torque cable 28 and the recliner torque cable 35 via a clutch mechanism as described later. Therefore, the operations of the slide adjustment mechanism Ms, the lifter adjustment mechanism Ml, the tilt adjustment mechanism Mt and the reclining angle adjustment mechanism Mr can be adjusted by the single motor 41.

Figure 5:
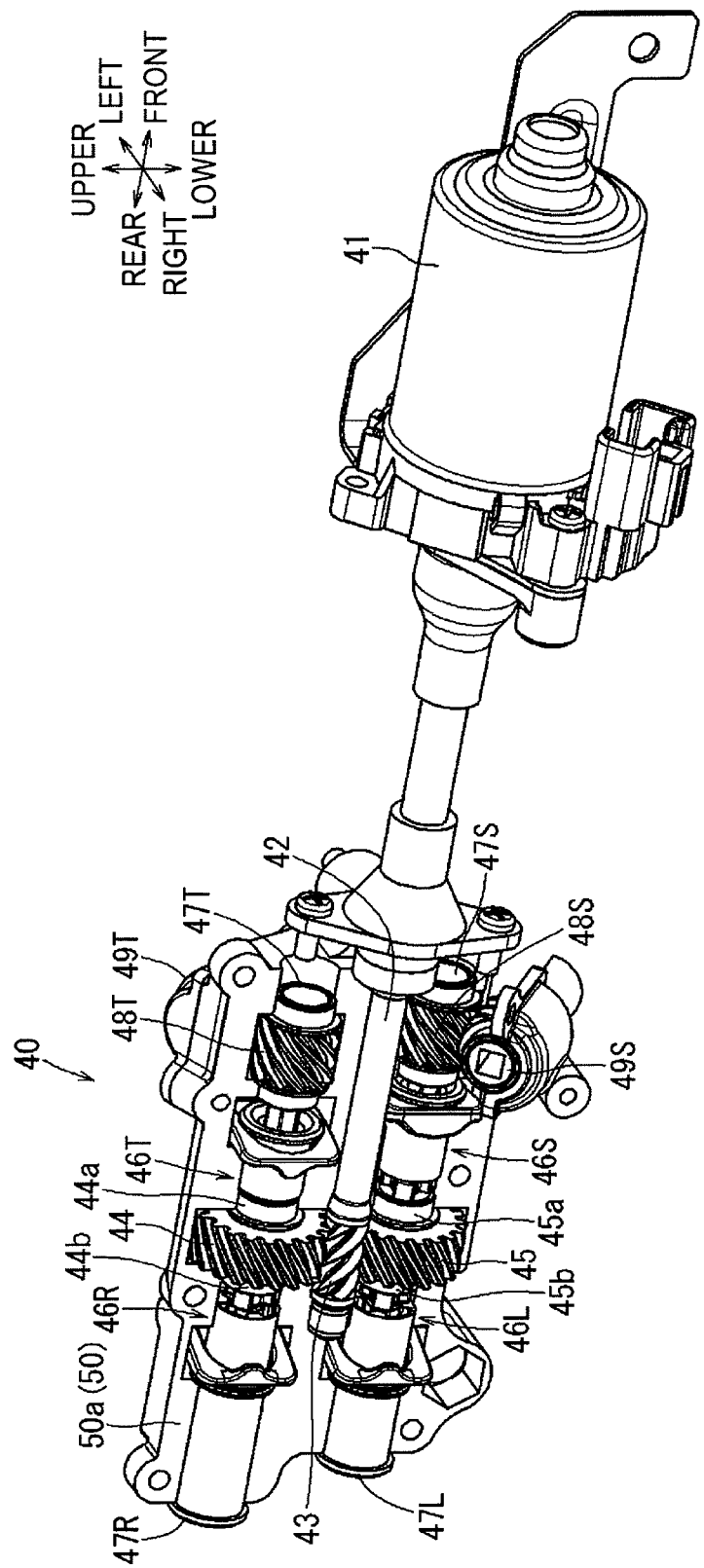
FIG. 5 is an enlarged perspective view of a driving mechanism part in the embodiment.

FIG. 5 shows details of the driving device 40. The driving device 40 includes a driving mechanism part and an operating mechanism part. In FIG. 5, only the driving mechanism part is shown, and the illustration of the operating mechanism part is omitted. The operating mechanism part includes a mechanism for turning on and off a switch (not shown) inserted and connected to a drive circuit (not shown) of the motor 41 and a mechanism for switching each clutch mechanism provided in the driving mechanism part (as described later) to a connected state or a non-connected state, in accordance with the operation of the first operation knob 66 and the second operation knob 67.

The driving mechanism part includes the single motor 41. The motor 41 includes a single motor output shaft 42. A worm 43 is coupled to the motor output shaft 42. A pair of worm wheels 44 and 45 disposed above and below the worm 43 is meshed with the worm 43. Therefore, uniaxial rotation output from the motor 41 is converted into biaxial rotation output by the combination of the worm 43 and the worm wheels 44 and 45.

Clutch mechanisms are respectively coupled to both sides in the front and rear direction of each rotating shaft of the worm wheels 44 and 45. That is, a tilting clutch mechanism 46T is coupled to an input shaft 44a on a front side of the rotating shaft of the worm wheel 44 and a recliner clutch mechanism 46R is coupled to an input shaft 44b on a rear side thereof. Further, a sliding clutch mechanism 46S is coupled to an input shaft 45a on a front side of the rotating shaft of the worm wheel 45 and a lifter clutch mechanism 46L is coupled to an input shaft 45b on a rear side thereof A helical gear 48T is coupled to an output shaft 47T of the tilting clutch mechanism 46T. A helical gear 49T having a rotating shaft arranged in a direction intersecting with a rotating shaft of the helical gear 48T is meshed with the helical gear 48T. An axial direction of the output shaft 47T of the tilting clutch mechanism 46T is converted by the combination of both helical gears 48T and 49T.

Furthermore, a helical gear 48S is coupled to an output shaft 47S of the sliding clutch mechanism 46S. A helical gear 49S having a rotating shaft arranged in a direction intersecting with a rotating shaft of the helical gear 48S is meshed with the helical gear 48S. An axial direction of the output shaft 47S of the sliding clutch mechanism 46S is converted by the combination of the helical gears 48S and 49S. Axial directions of an output shaft 47R of the recliner clutch mechanism 46R and an output shaft 47L of the lifter clutch mechanism 46L are not converted.

FIG. 5 shows a connected state in the tilting clutch mechanism 46T in which the input shaft 44a and the output shaft 47T are connected with each other. FIG. 5 also shows a disconnected state in the recliner clutch mechanism 46R, the sliding clutch mechanism 46S and the lifter clutch mechanism 46L in which respective input shafts 44b, 45a and 45b and respective output shafts 47R, 47S and 47L thereof are disconnected from each other. In the connected state in the tilting clutch mechanism 46T, the rotation of the motor 41 is transmitted to the tilt adjustment mechanism Mt via the tilting clutch mechanism 46T. When the tilting clutch mechanism 46T becomes a disconnected state and one of the recliner clutch mechanism 46R, the sliding clutch mechanism 46S and the lifter clutch mechanism 46L becomes a connected state, the rotation of the motor 41 is transmitted to the adjustment mechanism corresponding to the clutch mechanism in the connected state.

Members such as the motor 41 and the clutch mechanisms 46S, 46T, 46L and 46R constituting the driving mechanism part of the driving device 40 are accommodated in a half gear case 50a. The half gear case 50a is covered with a half gear case 50b (see FIG. 2) to form a gear case 50 that is a single case.

The operating mechanism part of the driving device 40 is configured in such a manner that respective clutch driving means (not shown) for individually driving the respective clutch mechanisms 46S, 46T, 46L and 46R, a switch connected to an actuating circuit of the motor 41, and a switch operating means (not shown) for operating the switch and the like are disposed on the right side of the gear case 50 and an operating mechanism cover 65 is covered thereon (see FIG. 1). Further, the first operation knob 66 and the second operation knob 67 are disposed on the right side of the operating mechanism cover 65.

In the above power seat, any one of the clutch mechanisms 46S, 46T, 46L and 46R corresponding to the adjustment mechanisms Ms, Mt, Ml and Mr selected by the operation of the first operation knob 66 and the second operation knob 67 is connected, and the output of the motor 41 is transmitted to any one of the adjustment mechanisms Ms, Ml, Mt and Mr via the respective torque cables 16, 22, 28 and 35. As a result, any one of the adjustment mechanisms Ms, Ml, Mt and Mr is actuated by the single motor 41.

Figure 6:
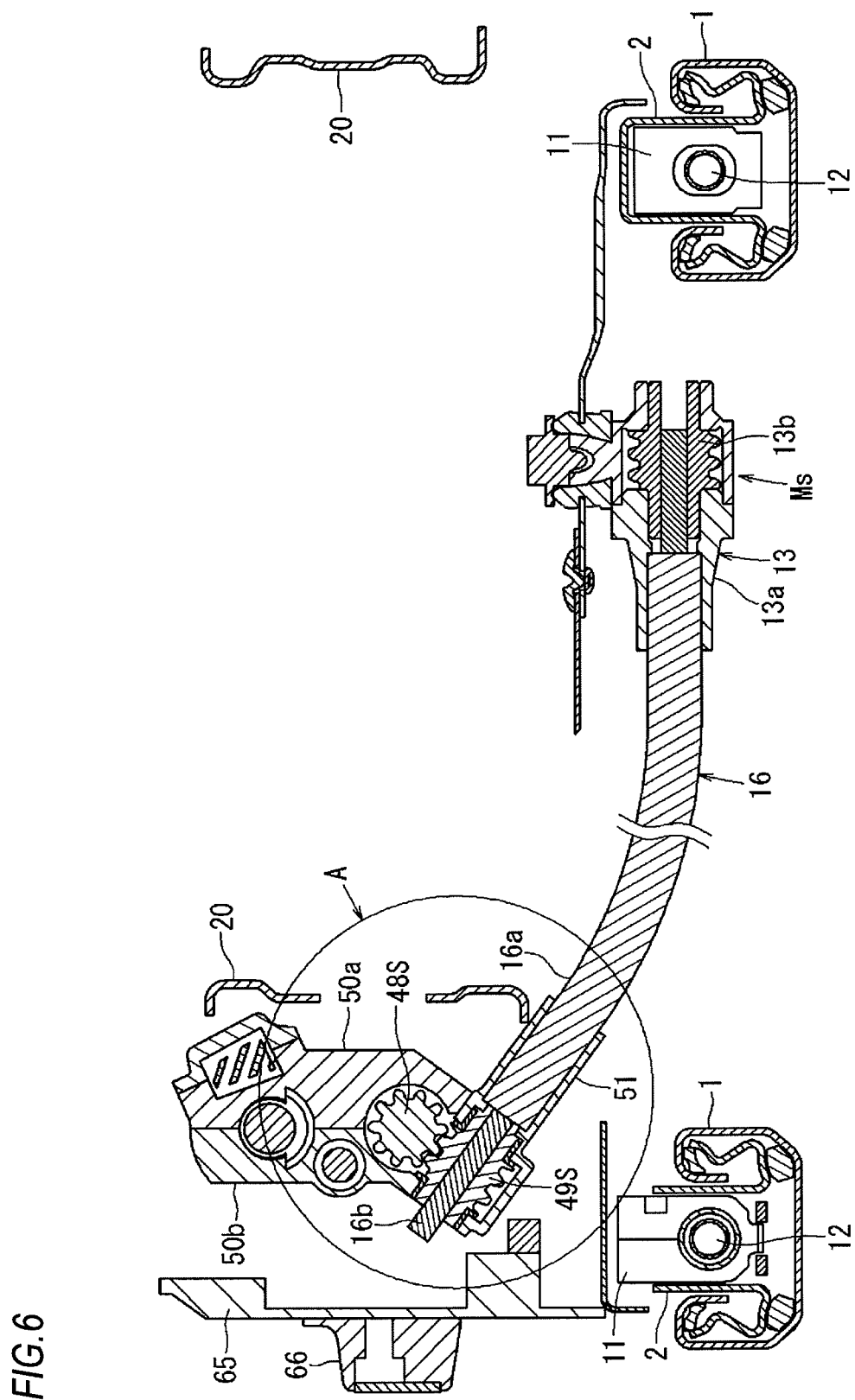
FIG. 6 is an enlarged front view of a power transmission cable in the embodiment, showing a state in which a height of a seat is set to the minimum height.
Figure 7:
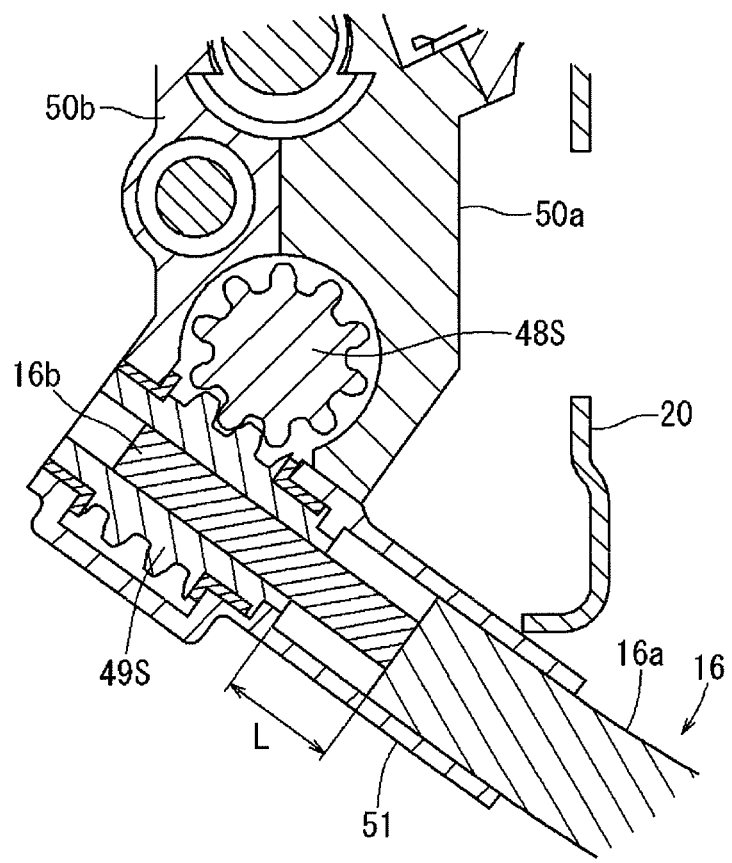
FIG. 7 is an enlarged view of the "A" part in FIG. 6, showing a state in which the height of the seat is set to the maximum height.

The motor 41 and the driving device 40 are fixed to the side frame 20. Further, the lifter adjustment mechanism Ml, the tilt adjustment mechanism Mt and the reclining angle adjustment mechanism Mr are also fixed so as not to move relative to the side frame 20. On the other hand, the slide adjustment mechanism Ms is fixed to the upper rail 2 away from the side frame 20. As shown in FIG. 6, one end of the sliding torque cable 16 is connected to a cable connector 51 which is a connection part on the side of the motor and the other end of the sliding cable 16 is connected to a cable connector 13a which is a connection part on the side of the slide adjustment mechanism Ms. Therefore, when the height of the seat 6 is adjusted by the lifter adjustment mechanism Ml, a relative position between the cable connector 51 and the cable connector 13a varies in the upper and lower direction. FIG. 6 shows a state in which the height of the seat 6 is the lowest. In this state, a distance between the cable connector 51 and the cable connector 13a becomes the shortest. On the other hand, FIG. 7 shows a state in which the height of the seat 6 is the highest. In this state, the distance between the cable connector 51 and the cable connector 13a becomes the longest. Here, the side frame 20 to which the motor 41 is fixed corresponds to "first member" and the upper rail 2 to which the slide adjustment mechanism Ms is fixed corresponds to "second member" in the disclosure.

The sliding torque cable 16 includes an outer cable 16a and an inner cable 16b. The outer cable 16a is fixed so as not to move relative to the cable connector 13a but is fixed so as to be slidable in an axial direction of the sliding torque cable 16 with respect to the cable connector 51. Further, the inner cable 16b is fixed at a rotation center of a helical gear 13b so as not to move relative to the helical gear 13b but is fixed at a rotation center of the helical gear 49S so as to be slidable (movable) in the axial direction of the sliding torque cable 16 with respect to the helical gear 49S. The cable connector 13a corresponds to "bearing member for supporting the input shaft of the adjustment mechanism" in the disclosure, and the cable connector 51 corresponds to "bearing member for supporting the output shaft of the motor" in the disclosure. Further, the helical gear 13b corresponds to "input shaft of the adjustment mechanism" and corresponds to "pre-stage gear of the input shaft of the adjustment mechanism" in the disclosure. A helical gear (not shown) meshing with the helical gear 13b and coaxially coupled with the sliding connection rod 14 corresponds to "post-stage gear of the input shaft of the adjustment mechanism" in the disclosure. Further, the helical gear 49S corresponds to "output shaft of the motor" and corresponds to "post-stage gear of the output shaft of the motor" in the disclosure. The helical gear 48S corresponds to "pre-stage gear of the output shaft of the motor" in the disclosure.

Therefore, in the state where the distance between the cable connector 51 and the cable connector 13a becomes the shortest as shown in FIG. 6, the outer cable 16a is most deeply inserted into the cable connector 51, and the inner cable 16b passes through a rotating shaft of the helical gear 49S and protrudes outside of the helical gear 49S. On the other hand, in the state where the distance between the cable connector 51 and the cable connector 13a becomes the longest as shown in FIG. 7, the insertion amount of the outer cable 16a with respect to the cable connector 51 is reduced, and the insertion amount of the inner cable 16b with respect to the rotating shaft of the helical gear 49S is reduced. At this time, with respect to the positions of the outer cable 16a and the inner cable 16b of the sliding torque cable 16 in FIG. 6, the positions of the outer cable 16a and the inner cable 16b of the sliding torque cable 16 in FIG. 7 are shifted in a direction of the rotating shaft of the helical gear 49S by the dimension indicated by "L" in FIG. 7.

As shown in FIG. 7, in a state where the insertion amount of the inner cable 16b with respect to the rotating shaft of the helical gear 49S is reduced, the inner cable 16b is inserted to a position corresponding to a gear portion of the helical gear 49S. Therefore, the rotation torque of the inner cable 16b can be reliably transmitted to the helical gear 49S.

On the other hand, as shown in FIG. 6, the inner cable 16b penetrates the rotating shaft of the helical gear 49S and protrudes outside of the helical gear 49S. The helical gear 49S is a direction changing gear, and the direction of the rotating shaft of the helical gear 48S meshing with the helical gear 49S is deviated from the direction of the rotating shaft of the helical gear 49S. Therefore, the inner cable 16b can protrude outside without being restricted by other members, thereby sufficiently absorbing the extra length of the inner cable 16b.

Figure 8:
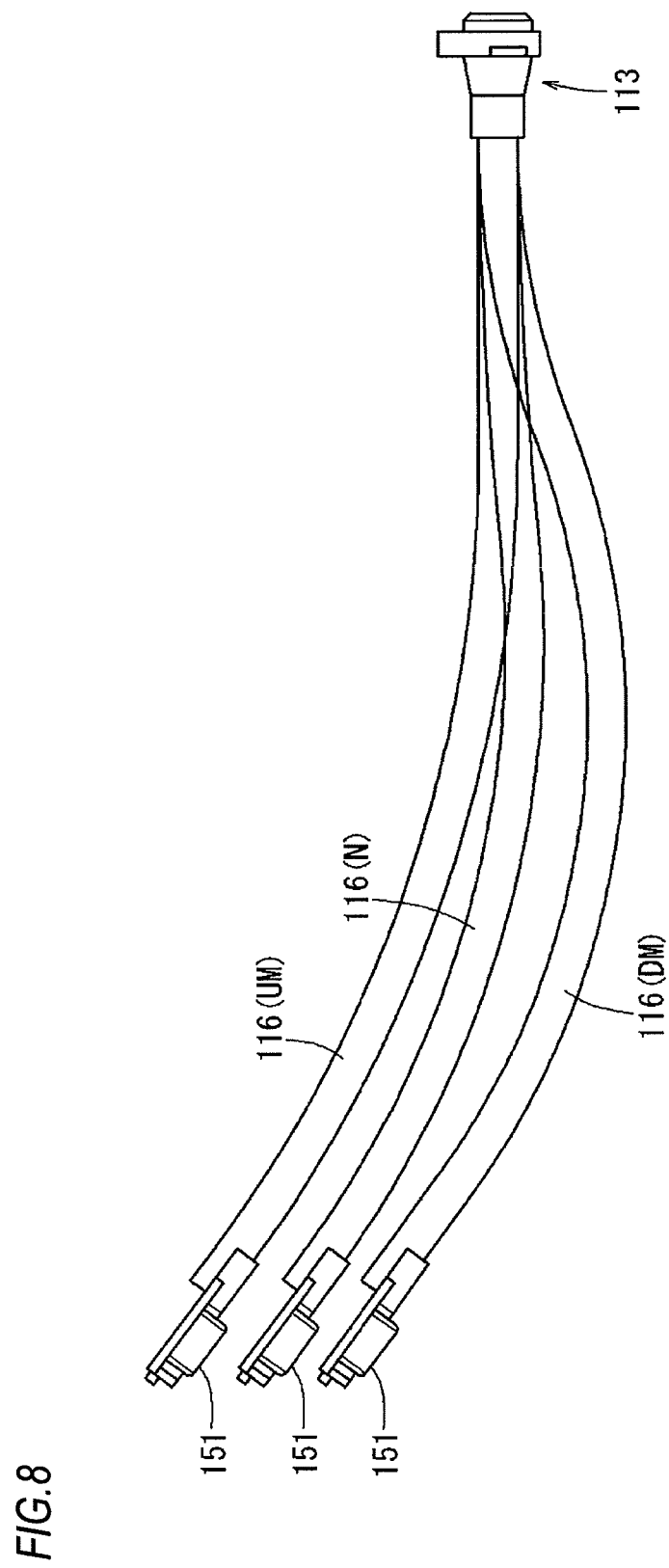
FIG. 8 is an explanatory view showing a change in the degree of curvature of a power transmission cable in a conventional technology.

As described above, in the present embodiment, the change in the distance between the cable connector 51 and the cable connector 13a of the sliding torque cable 16 due to the height adjustment of the seat 6 by the lifter adjustment mechanism Ml is absorbed by the movement of the outer cable 16a and the inner cable 16b with respect to the cable connector 51 and the helical gear 49S. Therefore, the change in the degree of curvature of the sliding torque cable 16 as in the conventional case described with reference to FIG. 8 is suppressed.

In the above embodiment, the portion of the sliding torque cable 16 on the side of the cable connector 13a is fixed so as not to relatively move and the portion of the sliding torque cable 16 on the side of the cable connector 51 is slidably fixed. Conversely, the portion of the sliding torque cable 16 on the side of the cable connector 13a may be slidable (movable) and the portion of the sliding torque cable 16 on the side of the cable connector 51 may be fixed so as not to relatively move.

Although specific embodiments have been described above, the disclosure is not limited to the appearances and configurations in these embodiments, and various modifications, additions and deletions can be made without changing the spirit of the disclosure. In the above embodiments, the disclosure is applied to a vehicle seat. However, the disclosure may be applied to a seat mounted on an airplane, a ship, a train, and the like, or a seat used in a movie theater.

The disclosure provides illustrative, non-limiting examples as follows:

A first aspect of the present disclosure is a power transmission device for a power seat, the power transmission device including: a motor; an adjustment mechanism of the power seat; and a power transmission cable which is configured to transmit power of the motor to the adjustment mechanism of the power seat, the power transmission cable including: an outer cable; and an inner cable which is rotatable in the outer cable, wherein the motor is fixed to a first member and the adjustment mechanism is fixed to a second member, and the first member and the second member are configured to be moved relative to each other, wherein a first end of the inner cable of the power transmission cable is connected to an output shaft of the motor and a second end of the inner cable of the power transmission cable is connected to an input shaft of the adjustment mechanism, wherein a first end of the outer cable of the power transmission cable is connected to a bearing member for supporting the output shaft of the motor and a second end of the outer cable of the power transmission cable is connected to a bearing member for supporting the input shaft of the adjustment mechanism, wherein the first end of the outer cable is connected to the bearing member for supporting the output shaft of the motor so as to be movable in an axial direction of the first end of the outer cable, or the second end of the outer cable is connected to the bearing member for supporting the input shaft of the adjustment mechanism so as to be movable in an axial direction of the second end of the outer cable, and wherein the first end of the inner cable is connected to the output shaft of the motor so as to be movable in an axial direction of the first end of the inner cable, or the second end of the inner cable is connected to the input shaft of the adjustment mechanism so as to be movable in an axial direction of the second end of the inner cable.

In the first aspect, the relative movement of the first member to which the motor is fixed and the second member to which the adjustment mechanism (also referred to as a first adjustment mechanism) is fixed can be conducted by the following three configurations. In a first configuration, the relative movement is performed by an operation of the adjustment mechanism itself. In a second configuration, the relative movement is performed by a second adjustment mechanism provided separately from the first adjustment mechanism. In a third configuration, the relative movement is performed by a second adjustment mechanism which is provided separately from the first adjustment mechanism and shares the motor with the first adjustment mechanism. In the case of the second configuration, the second adjustment mechanism may be manually operated. Further, in the case of the third configuration, the adjustment mechanisms may be simultaneously or individually operated by the common motor. Furthermore, in the case of the second and third configurations, the second adjustment mechanism is configured to move at least one of the first member which fixes the motor and the second member which fixes the adjustment mechanism.

According to the first aspect, the outer cable and the inner cable of the power transmission cable are connected so as to transmit the power of the motor to the adjustment mechanism. Moreover, the outer cable and the inner cable are connected to the motor or the adjustment mechanism so as to be movable in the axial direction. Therefore, when a distance between the motor and the adjustment mechanism is changed, the outer cable and the inner cable move in the axial direction at the connection portion with the motor or the adjustment mechanism to absorb a change in the distance. As a result, even when the distance between the motor and the adjustment mechanism is changed, it is possible to suppress a change in the degree of curvature of the power transmission cable.

A second aspect of the present disclosure is characterized in that in the first aspect, the adjustment mechanism is a first adjustment mechanism, and the first member and the second member are configured to be moved relative to each other by a second adjustment mechanism which is independent of the first adjustment mechanism.

The movement in the axial direction of the outer cable and the inner cable at the connection portion with the motor or the adjustment mechanism is difficult to perform while the inner cable is transmitting the power. According to the second aspect, the first member to which the motor is fixed and the second member to which the first adjustment mechanism is fixed are configured such that the relative position of the first member and the second member is moved by the second adjustment mechanism independent of the first adjustment mechanism. In the power seat, there is a low possibility that each adjustment mechanism is simultaneously operated and there is a high possibility that each adjustment mechanism is separately operated. Thus, when the first adjustment mechanism is operated, there is a high possibility that the movement in the axial direction of the outer cable and the inner cable at the connection portion with the motor or the adjustment mechanism is completed. Therefore, even when the distance between the motor and the adjustment mechanism is changed, it is possible to suppress the change in the degree of curvature of the power transmission cable.

A third aspect of the present disclosure is characterized in that in the first aspect, the adjustment mechanism includes a plurality of adjustment mechanisms, and the power of the motor is respectively transmitted to each of the plurality of adjustment mechanisms via respective power transmission cables, and a first adjustment mechanism that is one of the plurality of adjustment mechanisms is configured such that the first member and the second member to which the first adjustment mechanism is fixed are relatively moved by a second adjustment mechanism that is another one of the plurality of adjustment mechanisms.

According to the third aspect, the first member to which the motor is fixed and the second member to which the first adjustment mechanism is fixed are configured such that the relative position of the first member and the second member is moved by the second adjustment mechanism independent of the first adjustment mechanism. In addition, the first and second adjustment mechanisms are operated by the common motor. The first and second adjustment mechanisms may be configured to be individually and selectively operated by the common motor, or the first and second adjustment mechanisms may be configured to be simultaneously operated by the common motor. Therefore, in the case where the first and second adjustment mechanisms are configured to be individually and selectively operable, the movement in the axial direction of the outer cable and the inner cable at the connection portion with the motor or the adjustment mechanism can be completed when the first adjustment mechanism is operated. Further, even in the case where the first and second adjustment mechanisms are configured to be simultaneously operable, a torque for operating each adjustment mechanism is small since the torque of the single motor is distributed to both the first adjustment mechanism and the second adjustment mechanism. Therefore, even when the first adjustment mechanism is operated, the movement in the axial direction of the outer cable and the inner cable at the connection portion with the motor or the adjustment mechanism is facilitated, as compared to the case where the torque is large. Further, when the second adjustment mechanism is operated and the relative position of the first member and the second member is moved in a state where the first adjustment mechanism is not operated, the movement in the axial direction of the outer cable and the inner cable at the connection portion with the motor or the adjustment mechanism is performed without problems. Therefore, even when the distance between the motor and the adjustment mechanism is changed, it is possible to suppress the change in the degree of curvature of the power transmission cable.

A fourth aspect of the present disclosure is characterized in that in the third aspect, the first adjustment mechanism is a slide adjustment mechanism fixed to a slide member that is configured to adjust a position of the seat including a framework member in a direction along a support base, and the second adjustment mechanism is a vertical height adjustment mechanism that is configured to adjust a height of the seat including the framework member on the slide member, and the motor is fixed to the framework member.

When the first adjustment mechanism is the slide adjustment mechanism, a length of the power transmission cable tends to be longer than that of another adjustment mechanism such as a lifter adjustment mechanism and a reclining angle adjustment mechanism in the power seat. Further, the operation time also tends to be longer than that of other adjustment mechanisms. On the other hand, when the vertical height adjustment mechanism as the second adjustment mechanism is operated and a relative position between the framework member of the seat and the slide member is moved, the length of the power transmission cable for connecting the motor fixed to the framework member and the slide adjustment mechanism fixed to the slide member is changed. According to the fourth aspect, the outer cable and the inner cable of the power transmission cable are connected to the motor or the slide adjustment mechanism so as to be movable in the axial direction. Therefore, when the distance between the motor and the slide adjustment mechanism is changed, the outer cable and the inner cable move in the axial direction at the connection portion with the motor or the slide adjustment mechanism to absorb the change in the distance. As a result, even when the distance between the motor and the slide adjustment mechanism is changed, it is possible to suppress the change in the degree of curvature of the power transmission cable.

A fifth aspect of the present disclosure is characterized in that in the first aspect, the output shaft of the motor includes a pre-stage gear and a post-stage gear which are connected with each other, and a direction of a rotating shaft of the pre-stage gear is deviated from a direction of a rotating shaft of the post-stage gear, and the first end of the inner cable penetrates the rotating shaft of the post-stage gear of the output shaft of the motor and is coupled to the post-stage gear in a rotation direction of the post-stage gear so as to be slidable in the direction of the rotating shaft of the post-stage gear.

According to the fifth aspect, the first end of the inner cable penetrates the rotating shaft of the rear-stage gear of the output shaft of the motor. Further, the rotating shafts of the front-stage gear and the rear-stage gear are deviated from each other. Therefore, the movement in the axial direction of the inner cable can be easily conducted without being restricted by other members.

A sixth aspect of the present disclosure is characterized in that in the fifth aspect, in a state where a relative distance between the motor and the adjustment mechanism is a maximum length, the first end of the inner cable is set to a position corresponding to a gear portion of the post-stage gear in the direction of the rotating shaft of the post-stage gear of the output shaft of the motor, and wherein in a state where the relative distance between the motor and the adjustment mechanism is a minimum length, a tip end of the first end of the inner cable penetrates the rotating shaft of the post-stage gear of the output shaft of the motor and protrudes from the post-stage gear of the output shaft of the motor.

According to the sixth aspect, in the state where the relative distance between the motor and the adjustment mechanism is the maximum length, the first end of the inner cable is set to the position corresponding to the gear portion of the post-stage gear in the direction of the rotating shaft of the post-stage gear of the output shaft of the motor. Further, in the state where the relative distance between the motor and the adjustment mechanism is the minimum length, the tip end of the first end of the inner cable penetrates the rotating shaft of the post-stage gear of the output shaft of the motor and protrudes from the post-stage gear of the output shaft of the motor. Therefore, even when the relative distance is the maximum length, the rotation transmission between the inner cable and the post-stage gear can be reliably performed. Further, even when the relative distance is the minimum length, the extra length of the inner cable can be sufficiently absorbed.

A seventh aspect of the present disclosure is characterized in that in the first aspect, the input shaft of the adjustment mechanism includes a pre-stage gear and a post-stage gear which are connected with each other, and a direction of a rotating shaft of the pre-stage gear is deviated from a direction of a rotating shaft of the post-stage gear, and the second end of the inner cable penetrates the rotating shaft of the pre-stage gear of the input shaft of the adjustment mechanism and is coupled to the pre-stage gear in a rotation direction of the pre-stage gear so as to be slidable in the direction of the rotating shaft of the pre-stage gear.

According to the seventh aspect, the second end of the inner cable penetrates the rotating shaft of the pre-stage gear of the input shaft of the adjustment mechanism. Further, the rotating shafts of the pre-stage gear and the post-stage gear are deviated from each other. Therefore, the movement in the axial direction of the inner cable can be easily conducted without being restricted by other members.

A eighth aspect of the present disclosure is characterized in that in the seventh aspect, in a state where a relative distance between the motor and the adjustment mechanism is a maximum length, the second end of the inner cable is set to a position corresponding to a gear portion of the pre-stage gear in the direction of the rotating shaft of the pre-stage gear of the input shaft of the adjustment mechanism, and in a state where the relative distance between the motor and the adjustment mechanism is a minimum length, a tip end of the second end of the inner cable penetrates the rotating shaft of the pre-stage gear of the input shaft of the adjustment mechanism and protrudes from the pre-stage gear of the input shaft of the adjustment mechanism.

According to the eighth aspect, in the state where the relative distance between the motor and the adjustment mechanism is the maximum length, the second end of the inner cable is set to the position corresponding to the gear portion of the pre-stage gear in the direction of the rotating shaft of the pre-stage gear of the input shaft of the adjustment mechanism. Further, in the state where the relative distance between the motor and the adjustment mechanism is the minimum length, the tip end of the second end of the inner cable penetrates the rotating shaft of the pre-stage gear of the input shaft of the adjustment mechanism and protrudes from the pre-stage gear of the input shaft of the adjustment mechanism. Therefore, even when the relative distance is the maximum length, the rotation transmission between the inner cable and the pre-stage gear can be reliably performed. Further, even when the relative distance is the minimum length, the extra length of the inner cable can be sufficiently absorbed.

A ninth aspect of the present disclosure is characterized in that in the first aspect, the first end of the outer cable is connected to the bearing member for supporting the output shaft of the motor so as to be movable in the axial direction of the first end of the outer cable and the second end of the outer cable is fixed to the bearing member for supporting the input shaft of the adjustment mechanism so as not to be relatively moved, or the second end of the outer cable is connected to the bearing member for supporting the input shaft of the adjustment mechanism so as to be movable in the axial direction of the second end of the outer cable and the first end of the outer cable is fixed to the bearing member for supporting the output shaft of motor so as not to be relatively moved, and the first end of the inner cable is connected to the output shaft of the motor so as to be movable in the axial direction of the first end of the inner cable and the second end of the inner cable is fixed to the input shaft of the adjustment mechanism so as not to be relatively moved, or the second end of the inner cable is connected to the input shaft of the adjustment mechanism so as to be movable in the axial direction of the second end of the inner cable and the first end of the inner cable is fixed to the output shaft of motor so as not to be relatively moved.

A tenth aspect of the present disclosure is characterized in that in the first aspect, the first end of the outer cable is connected to the bearing member for supporting the output shaft of the motor so as to be movable in the axial direction of the first end of the outer cable and the second end of the outer cable is fixed to the bearing member for supporting the input shaft of the adjustment mechanism so as not to be relatively moved, and the first end of the inner cable is connected to the output shaft of the motor so as to be movable in the axial direction of the first end of the inner cable and the second end of the inner cable is fixed to the input shaft of the adjustment mechanism so as not to be relatively moved.

In the above embodiment, the first adjustment mechanism which is connected to the motor via the power transmission cable and whose fixation position moves relative to the motor is the slide adjustment mechanism. The second adjustment mechanism which causes the relative movement is the lifter adjustment mechanism. Both mechanisms are configured to be operated by the single motor. This embodiment corresponds to the third configuration described in the first aspect of the disclosure.

As another embodiment for this embodiment, both the first adjustment mechanism and the second adjustment mechanism may be provided with respective motors independently. In yet another embodiment, the lifter adjustment mechanism as the second adjustment mechanism may be manually operated. These other embodiments correspond to the second configuration described in the first aspect of the disclosure.

In yet another embodiment, the adjustment mechanism operated by the motor via the power transmission cable may be a folding adjustment mechanism of the seat back. The folding adjustment mechanism is configured such that the seat back is bent in the front and rear direction between the upper end portion and a lower end portion of the seat back and a bending angle of the seat back can be adjusted. In this case, a relative position between the motor and the folding adjustment mechanism is changed by their own adjustment operation. This embodiment corresponds to the first configuration described in the first aspect of the disclosure.

What is claimed is:

1. A power transmission device for a power seat, the power transmission device comprising:
   a motor;
   a first power seat adjustment mechanism of the power seat;
   a second power seat adjustment mechanism of the power seat; and
   a power transmission cable which is configured to transmit power of the motor to the first power seat adjustment mechanism of the power seat, the power transmission cable including:
   an outer cable; and
   an inner cable which is rotatable in the outer cable, wherein the motor is fixed to a first structure and the first power seat adjustment mechanism is fixed to a second structure, and the first structure and the second structure are movable relative to each other by the second power seat adjustment mechanism which is independent of the first power seat adjustment mechanism, wherein a first end of the inner cable of the power transmission cable is connected to an output shaft of the motor and a second end of the inner cable of the power transmission cable is connected to an input shaft of the first power seat adjustment mechanism, wherein a first end of the outer cable of the power transmission cable is connected to a bearing that supports the output shaft of the motor and a second end of the outer cable of the power transmission cable is connected to a bearing that supports the input shaft of the first power seat adjustment mechanism, wherein the first end of the outer cable is connected to the bearing that supports the output shaft of the motor so as to be movable in an axial direction of the first end of the outer cable during operation of the second power seat adjustment mechanism, or the second end of the outer cable is connected to the bearing that supports the input shaft of the first power seat adjustment mechanism so as to be movable in an axial direction of the second end of the outer cable during the operation of the second power seat adjustment mechanism, and wherein the first end of the inner cable is connected to the output shaft of the motor so as to be movable in an axial direction of the first end of the inner cable during the operation of the second power seat adjustment mechanism, or the second end of the inner cable is connected to the input shaft of the first power seat adjustment mechanism so as to be movable in an axial direction of the second end of the inner cable during the operation of the second power seat adjustment mechanism.

2. The power transmission device for the power seat according to claim 1,
wherein the power of the motor is respectively transmitted to each of the first and second power seat of adjustment mechanisms via respective power transmission cables.

3. The power transmission device for the power seat according to claim 2,
wherein the first power seat adjustment mechanism is a power seat slide adjustment mechanism fixed to a slide to adjust a position of the power seat including a framework in a direction along a support base,
wherein the second power seat adjustment mechanism is a power seat vertical height adjustment mechanism to adjust a height of the power seat including the framework on the slide, and
wherein the motor is fixed to the framework.

4. The power transmission device for the power seat according to claim 1,
wherein the output shaft of the motor includes a pre-stage gear and a post-stage gear which are connected with each other,
wherein a direction of a rotating shaft of the pre-stage gear is deviated from a direction of a rotating shaft of the post-stage gear, and
wherein the first end of the inner cable penetrates the rotating shaft of the post-stage gear of the output shaft of the motor and is coupled to the post-stage gear in a rotation direction of the post-stage gear so as to be slidable in the direction of the rotating shaft of the post-stage gear.

5. The power transmission device for the power seat according to claim 4,
wherein in a state where a relative distance between the motor and the first power seat adjustment mechanism is a maximum length, the first end of the inner cable is set to a position corresponding to a gear portion of the post-stage gear in the direction of the rotating shaft of the post-stage gear of the output shaft of the motor, and
wherein in a state where the relative distance between the motor and the first power seat adjustment mechanism is a minimum length, a tip end of the first end of the inner cable penetrates the rotating shaft of the post-stage gear of the output shaft of the motor and protrudes from the post-stage gear of the output shaft of the motor.

6. The power transmission device for the power seat according to claim 1,
wherein the input shaft of the first power seat adjustment mechanism includes a pre-stage gear and a post-stage gear which are connected with each other,
wherein a direction of a rotating shaft of the pre-stage gear is deviated from a direction of a rotating shaft of the post-stage gear, and
wherein the second end of the inner cable penetrates the rotating shaft of the pre-stage gear of the input shaft of the first power seat adjustment mechanism and is coupled to the pre-stage gear in a rotation direction of the pre-stage gear so as to be slidable in the direction of the rotating shaft of the pre-stage gear.

7. The power transmission device for the power seat according to claim 6,
wherein in a state where a relative distance between the motor and the first power seat adjustment mechanism is a maximum length, the second end of the inner cable is set to a position corresponding to a gear portion of the pre-stage gear in the direction of the rotating shaft of the pre-stage gear of the input shaft of the first power seat adjustment mechanism, and
wherein in a state where the relative distance between the motor and the first power seat adjustment mechanism is a minimum length, a tip end of the second end of the inner cable penetrates the rotating shaft of the pre-stage gear of the input shaft of the first power seat adjustment mechanism and protrudes from the pre-stage gear of the input shaft of the first power seat adjustment mechanism.

8. The power transmission device for the power seat according to claim 1,
wherein the first end of the outer cable is connected to the bearing that supports the output shaft of the motor so as to be movable in the axial direction of the first end of the outer cable and the second end of the outer cable is fixed to the bearing that supports the input shaft of the first power seat adjustment mechanism so as not to be relatively moved, or the second end of the outer cable is connected to the bearing that supports the input shaft of the first power seat adjustment mechanism so as to be movable in the axial direction of the second end of the outer cable and the first end of the outer cable is fixed to the bearing that supports the output shaft of motor so as not to be relatively moved, and
wherein the first end of the inner cable is connected to the output shaft of the motor so as to be movable in the axial direction of the first end of the inner cable and the second end of the inner cable is fixed to the input shaft of the first power seat adjustment mechanism so as not to be relatively moved, or the second end of the inner cable is connected to the input shaft of the first power seat adjustment mechanism so as to be movable in the axial direction of the second end of the inner cable and the first end of the inner cable is fixed to the output shaft of motor so as not to be relatively moved.

9. The power transmission device for the power seat according to claim 1,
wherein the first end of the outer cable is connected to the bearing that supports the output shaft of the motor so as to be movable in the axial direction of the first end of the outer cable and the second end of the outer cable is fixed to the bearing that supports the input shaft of the first power seat adjustment mechanism so as not to be relatively moved, and
wherein the first end of the inner cable is connected to the output shaft of the motor so as to be movable in the axial direction of the first end of the inner cable and the second end of the inner cable is fixed to the input shaft of the first power seat adjustment mechanism so as not to be relatively moved
wherein the first end of the inner cable is connected to the output shaft of the motor so as to be movable in an axial direction of the first end of the inner cable, or the second end of the inner cable is connected to the input shaft of the power seat adjustment mechanism so as to be movable in an axial direction of the second end of the inner cable,
wherein the output shaft of the motor includes a pre-stage gear and a post-stage gear which are connected with each other,
wherein a direction of a rotating shaft of the pre-stage gear is deviated from a direction of a rotating shaft of the post-stage gear,
wherein the first end of the inner cable penetrates the rotating shaft of the post-stage gear of the output shaft of the motor and is coupled to the post-stage gear in a rotation direction of the post-stage gear so as to be slidable in the direction of the rotating shaft of the post-stage gear,
wherein in a state where a relative distance between the motor and the power seat adjustment mechanism is a maximum length, the first end of the inner cable is set to a position corresponding to a gear portion of the post-stage gear in the direction of the rotating shaft of the post-stage gear of the output shaft of the motor, and
wherein in a state where the relative distance between the motor and the power seat adjustment mechanism is a minimum length, a tip end of the first end of the inner cable penetrates the rotating shaft of the post-stage gear of the output shaft of the motor and protrudes from the post-stage gear of the output shaft of the motor.

10. A power transmission device for a power seat, the power transmission device comprising:
a motor;
a power seat adjustment mechanism of the power seat; and
a power transmission cable which is configured to transmit power of the motor to the power seat adjustment mechanism of the power seat, the power transmission cable including:
an outer cable; and
an inner cable which is rotatable in the outer cable,
wherein the motor is fixed to a first structure and the power seat adjustment mechanism is fixed to a second structure, and the first structure and the second structure are movable relative to each other,
wherein a first end of the inner cable of the power transmission cable is connected to an output shaft of the motor and a second end of the inner cable of the power transmission cable is connected to an input shaft of the power seat adjustment mechanism,
wherein a first end of the outer cable of the power transmission cable is connected to a bearing that supports the output shaft of the motor and a second end of the outer cable of the power transmission cable is connected to a bearing that supports the input shaft of the power seat adjustment mechanism,
wherein the first end of the outer cable is connected to the bearing that supports the output shaft of the motor so as to be movable in an axial direction of the first end of the outer cable, or the second end of the outer cable is connected to the bearing that supports the input shaft of the power seat adjustment mechanism so as to be movable in an axial direction of the second end of the outer cable, as to be movable in the axial direction of the second end of the outer cable and the first end of the outer cable is fixed to the bearing that supports the output shaft of motor so as not to be relatively moved, and
wherein the first end of the inner cable is connected to the output shaft of the motor so as to be movable in the axial direction of the first end of the inner cable and the second end of the inner cable is fixed to the input shaft of the first power seat adjustment mechanism so as not to be relatively moved, or the second end of the inner cable is connected to the input shaft of the first power seat adjustment mechanism so as to be movable in the axial direction of the second end of the inner cable and the first end of the inner cable is fixed to the output shaft of motor so as not to be relatively moved.

11. A power transmission device for a power seat, the power transmission device comprising:
a motor;
a power seat adjustment mechanism of the power seat; and
a power transmission cable which is configured to transmit power of the motor to the power seat adjustment mechanism of the power seat, the power transmission cable including:
an outer cable; and
an inner cable which is rotatable in the outer cable,
wherein the motor is fixed to a first structure and the power seat adjustment mechanism is fixed to a second structure, and the first structure and the second structure are movable relative to each other,
wherein a first end of the inner cable of the power transmission cable is connected to an output shaft of the motor and a second end of the inner cable of the power transmission cable is connected to an input shaft of the power seat adjustment mechanism,
wherein a first end of the outer cable of the power transmission cable is connected to a bearing that supports the output shaft of the motor and a second end of the outer cable of the power transmission cable is connected to a bearing that supports the input shaft of the power seat adjustment mechanism,
wherein the first end of the outer cable is connected to the bearing that supports the output shaft of the motor so as to be movable in an axial direction of the first end of the outer cable, or the second end of the outer cable is connected to the bearing that supports the input shaft of the power seat adjustment mechanism so as to be movable in an axial direction of the second end of the outer cable, wherein the first end of the inner cable is connected to the output shaft of the motor so as to be movable in an axial direction of the first end of the inner cable, or the second end of the inner cable is connected to the input shaft of the power seat adjustment mechanism so as to be movable in an axial direction of the second end of the inner cable, wherein the input shaft of the power seat adjustment mechanism includes a pre-stage gear and a post-stage gear which are connected with each other, wherein a direction of a rotating shaft of the pre-stage gear is deviated from a direction of a rotating shaft of the post-stage gear, wherein the second end of the inner cable penetrates the rotating shaft of the pre-stage gear of the input shaft of the power seat adjustment mechanism and is coupled to the pre-stage gear in a rotation direction of the pre-stage gear so as to be slidable in the direction of the rotating shaft of the pre-stage gear, wherein in a state where a relative distance between the motor and the power seat adjustment mechanism is a maximum length, the second end of the inner cable is set to a position corresponding to a gear portion of the pre-stage gear in the direction of the rotating shaft of the pre-stage gear of the input shaft of the power seat adjustment mechanism, and wherein in a state where the relative distance between the motor and the power seat adjustment mechanism is a minimum length, a tip end of the second end of the inner cable penetrates the rotating shaft of the pre-stage gear of the input shaft of the power seat adjustment mechanism and protrudes from the pre-stage gear of the input shaft of the power seat adjustment mechanism.

* * * * *